United States Patent
Rooney et al.

(10) Patent No.: US 6,559,222 B1
(45) Date of Patent: May 6, 2003

(54) PHOTONEUTRALIZATION OF PH SENSITIVE AQUEOUS POLYMERIC DISPERSIONS AND METHODS FOR USING SAME

(75) Inventors: John Rooney, Basking Ridge, NJ (US); Subhankar Chatterjee, Hampton, NJ (US); Mikhail Laksin, Scotch Plains, NJ (US); Jean-Dominque Turgis, Rutherford, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/674,214

(22) PCT Filed: Oct. 16, 1998

(86) PCT No.: PCT/US98/22035

§ 371 (c)(1),
(2), (4) Date: Sep. 17, 2001

(87) PCT Pub. No.: WO99/19369

PCT Pub. Date: Apr. 22, 1999

Related U.S. Application Data

(60) Provisional application No. 60/062,185, filed on Oct. 16, 1997.

(51) Int. Cl.[7] ............................................. C08L 31/00
(52) U.S. Cl. ....................... 524/556; 524/589; 524/601; 524/606; 524/612
(58) Field of Search ................................ 524/556, 589, 524/601, 606, 612

(56) References Cited

U.S. PATENT DOCUMENTS

| | | | |
|---|---|---|---|
| 3,825,430 A | 7/1974 | Kurka ........................ 96/115 R |
| 4,293,636 A | 10/1981 | Okuya ........................ 430/281 |
| 4,745,138 A | 5/1988 | Thanawalla et al. ........ 522/120 |
| 4,994,346 A | 2/1991 | Meier et al. ................ 430/280 |
| 5,206,116 A | 4/1993 | Daniels et al. .............. 430/311 |
| 5,296,332 A | 3/1994 | Sachdev et al. ............. 430/270 |
| 5,300,380 A | 4/1994 | Roth et al. ...................... 430/18 |
| 5,308,744 A | 5/1994 | Koes ............................ 430/326 |
| 5,344,748 A | 9/1994 | Feely .......................... 430/330 |
| 5,384,229 A | 1/1995 | Pai et al. ..................... 430/270 |
| 5,439,779 A * | 8/1995 | Day ............................. 430/280 |
| 5,498,765 A | 3/1996 | Carpenter, Jr. et al. ..... 430/323 |
| 5,585,222 A | 12/1996 | Kaimoto et al. ............ 430/296 |
| 6,210,790 B1 * | 4/2001 | Crivello ...................... 428/325 |
| 6,248,810 B1 * | 6/2001 | St. Clair ..................... 523/416 |

FOREIGN PATENT DOCUMENTS

| | | | |
|---|---|---|---|
| EP | 0 267 554 A2 | 5/1988 | ......... C08F/220/10 |
| EP | 0 469 537 A2 | 2/1992 | ............. G03F/7/16 |
| EP | 0 614 953 A1 | 9/1994 | ............ C09D/11/10 |
| EP | 0 813 976 A1 | 6/1996 | ............. B41M/1/10 |
| FR | 2253772 | 12/1973 | ........... C08G/39/00 |
| JP | 06233114 | 11/1985 | |
| WO | WO 96/24888 | 8/1996 | ............. G03F/7/32 |

OTHER PUBLICATIONS

Anonymous: "Photoinitiators for Daylight Curable Coatings", Research Disclosure, vol. 283, No. 047, Nov. 10, 1987.

Brehme S. and Pickenhain R., "A Simple Method for the Determination of Both Photoioniation and Photoneutralization Cross–Sections of Deep Levels by Optical DLTS", Sektion Physik der Karl Marx Universitat Leipzig, pp. K63–K66, 1985.

Sauntson, B.J., "Acrylic Copolymers for Water–Based Printing Inks", The British Ink Maker, pp. 26–29, 1975.

\* cited by examiner

*Primary Examiner*—Edward J. Cain
(74) *Attorney, Agent, or Firm*—Sidney Persley

(57) ABSTRACT

An aqueous polymer dispersion comprising a polymer substantially free of cationic polymerizable groups and a cationic photoinitiator, wherein the polymer is capable of being precipitated by an acid or base generating photoinitiator upon exposure to radiation and is optionally an energy curable polymer.

27 Claims, No Drawings

PHOTONEUTRALIZATION OF PH SENSITIVE AQUEOUS POLYMERIC DISPERSIONS AND METHODS FOR USING SAME

This application claims the benefit of provisional application No. 60/062,185, filed Oct. 16, 1997.

BACKGROUND OF THE INVENTION

1. Field of the Invention

The present invention relates to photoneutralized, pH sensitive, aqueous polymeric dispersions.

2. Description of Related Art

Free radical polymerizable compositions offer a number of advantages over heat or ambient temperature curing, including: rapid curing at ambient temperatures; elimination of solvents and the environmental problems associated with there use; elimination of solvent recovery; elimination of the use of fossil fuels for curing and their polluting effects; and the capability of coating heat sensitive substrates. However, radiation curing at times introduces its own difficulties, such as in connection with formulating compositions having varying degrees of viscosity; use of toxic components and inhibition of curing by air contact. These difficulties may be substantially overcome by selective formulation of the radiation curable composition, and hence, the selection of the components of the radiation curable composition becomes critical.

Radiation curable compositions are well known in the art. Monomers typically used for such purpose include acrylic and methacrylic acid esters of various diols and triols, such as 1,6-hexanediol, diethylene glycol, 1,4 butanediol, trimethoxypropane, pentaerythritol or glycerol, along with alkoxylated monomers, such as ethoxylated and propoxylated derivatives thereof. Typical examples of radiation curable compositions employing some of the above-described monomers have been described in U.S. Pat. Nos. 3,594,410 and 3,380,831, which are concerned with printing and thermal transfer reproductive elements. U.S. Pat. Nos. 3,912,670; 4,025,548; 4,183,796; 4,243,500; 4,360,540; and 4,404,075 teach radiation curable coating and adhesive compositions. It is also well known to prepare radiation curable compositions using specialized polymerizable materials. For example, U.S. Pat. Nos. 4,994,346; 5,308,744; 5,300,380; 5,585,222; and 5,498,765 teach film forming photoreactive polymeric compositions for use in photoresist materials. The polymeric material employed in each case, however, contains cationic polymerizable groups. U.S. Pat. Nos. 5,206,116; 5,296,332; and 5,384,229 describe film forming photoreactive polymers that also contain cationic polymerizable systems for use in electrodeposition or solder masking. In U.S. Pat. Nos. 3,356,461 and 3,342,787, esters of styrene maleic anhydride copolymers are used. U.S. Pat. Nos. 3,862,067 and 3,884,856 disclose styrene maleic anhydride copolymers derived from low molecular weight copolymers of styrene and maleic anhydride. U.S. Pat. Nos. 3,825,430 and 4,401,793 teach the use of polymerizable esters prepared by reacting an anhydride-containing polymer with an excess of hydroxyalkylacrylate or methacrylate wherein the esters are free of unreacted anhydride groups. French Patent 2,253,772 describes the use of styrene-maleic anhydride polymers having free hydroxyl groups. U.S. Pat. No. 4,293,636 teaches a photopolymerizable composition containing polyester, half esterified hydroxyalkylacrylate of polybasic acid and vinyl monomer. However, all of these references teach radiation curable compositions containing organic solvents.

Representing a departure from solvent based radiation curable compositions, European Patent 0 257 554 A2 teaches a radiation curable composition employing a stable aqueous dispersion of polymers produced from a monomer containing ethylenic unsaturation and pendant cationic ethylenic functionalities. The polymers cross-link upon exposure to radiation in the presence of a cationic photoinitiator. U.S. Pat. No. 4,745,138 describes a radiation curable composition comprising low molecular weight partial ester of free anhydride-containing copolymers. These polymers, however, are not water soluble or dispersible due to the free anhydride functionalities.

For the most part, the prior art does not teach aqueous polymer dispersions or solutions wherein in the presence of a cationic photoinitiator, the polymer precipitates out of the dispersion or solution to form a film upon exposure to radiation.

The prior art does not teach aqueous polymer dispersions or solutions wherein in the presence of a cationic photoinitiator, the polymer precipitates out of the dispersion or solution to form and undergo cross-linking upon exposure to radiation.

It is a primary object of the present invention to provide an aqueous polymer dispersion or solution wherein in the presence of a cationic photoinitiator, the polymer does not polymerize but precipitates out of solution to form a film.

It is also an object of the present invention to provide an aqueous polymer dispersion or solution wherein in the presence of a cationic photoinitiator, the polymer does not polymerize but precipitates out of solution to form a free radical cross-linkable film when exposed to radiation.

Another object of the present invention is to prepare simple and inexpensive printing inks and coatings using these aqueous polymer dispersions.

Another object of the present invention is to prepare simple and inexpensive energy curable printing inks and coatings using these aqueous polymer dispersions.

These an other objects, which will become apparent from the following description of the present invention.

SUMMARY OF THE INVENTION

In one aspect the invention is an energy curable basic aqueous polymer dispersion wherein the polymer is substantially free of cationic polymerizable functionalities and capable of being precipitated from the dispersion in the presence of an acid generating photoinitiator upon exposure to radiation.

In another aspect the invention is a water based energy curable coating and ink composition employing these energy curable basic aqueous polymer dispersions.

DETAILED DESCRIPTION OF THE INVENTION

The invention extends the use of radiation curing technology to the vast and economical array of water based polymer systems used in water base printing and coating. Water base polymeric systems typically contain acidic or basic functional resins neutralized to a certain pH by a base or acid, respectively, in order to solubilize the resin or resin system in water. As in the prior art, the polymers of the present invention are neutralized and are soluble or dispersible in aqueous medium. However, unlike prior art polymers, the polymers of the present invention are substantially free of cationic polymerizable functionalities and thereby avoid cross-linking via a cationic mechanism when exposed to radiation. The polymer, may however, optionally contain free radical polymerizable functionalities rendering it capable of cross-linking via a free radical mechanism upon exposure to radiation.

Three essential characteristic features are required of the polymers suitable for use in the present invention: a) the polymer must be substantially free of cationic polymerizable functionalities; b) the polymer must be soluble or dispersible in a basic aqueous solution and an acid generating photoinitiator; and (c) the polymer must precipitate out of such solution upon exposure to radiation. Polymers suitable for use in the present invention, for example, may include polyamide resins, acrylic resins, acrylated acrylic resins, amino resins, polyester resins, urethane resins, starch, polysulfonate resins, phenolic resins and melamine resins. In addition to meeting these requirements the polymer may optionally containing free radical polymerizable functionalities, for example, the class of compounds meeting these requirements would include copolymers of the general structure:

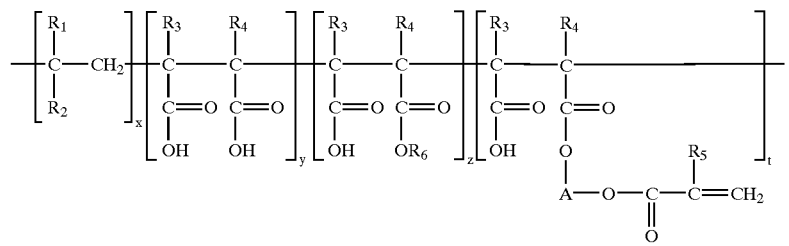

wherein: $R_1$ and $R_2$ are independently selected from the group consisting of hydrogen, $C_1$–$C_{20}$ alkyl, $C_6$–$C_{10}$ aryl, $C_7$–$C_{14}$ alkaryl, $C_4$–$C_{12}$ cycloalkyl and halogen such as chlorine, fluorine and bromine; and preferably are independently selected from hydrogen, methyl, phenyl, benzyl, or $C_4$–$C_6$ cycloalkyl; $R_3$, $R_4$ and $R_5$ are independently selected from the group consisting of hydrogen and $C_1$–$C_5$ alkyl; and preferably are independently selected from hydrogen and/or methyl; $R_6$ is selected from the group consisting of alkyl, aralkyl, alkyl substituted aralkyl and oxyalkylated derivatives of same containing 2 to 4 carbon atoms in each oxyalkylene group, which group may be 1 to 20 and preferably 1 to 6 repeating units; A is a linear or branched divalent $C_1$–$C_{20}$ alkylene or oxyalkylated derivative thereof as described in connection with $R_6$; and subscripts x, y, z and t are whole numbers such that the sum of x, y, z and t ranges from 3 to 20, with each being equal to or greater than 1.

In general, the polymerizable compositions of the present invention may be liquids or free flowing solids, depending upon their molecular weight, and are characterized by having a number average molecular weight if between about 1,000 and 20,000, preferably between 2,000 and 4,000, an acid number between 100 to 300 and preferably between 180 and 300, an acrylate equivalent per gram value of at least 0.1, preferably between 10 to 50 molar percent, and a glass transition temperature of at least about 40 degrees C and preferably between 50 and 100 degrees C.

The polymers containing free radical polymerizable functionalities, optionally employed in the present invention, may be prepared, for example, by reacting a styrene/maleic anhydride copolymer, a hydroxyl terminated acrylate and a monofunctional alcohol to form a partial ester. Next, any remaining anhydride functionalities would be opened with a water/ammonia mixture. The solvent would then removed through a solvent exchange process.

A reaction scheme for preparing the free radical polymerizable functionalities employed herein, for example, may constitute adding methyl isobutyl ketone (MIBK) under agitation to a styrene maleic anhydride copolymer having an acid number of 480 and an average molecular weight of 1600. The two materials are then heated to approximately 95–110 degrees C. over 1 to 2 hours under a nitrogen blanket. Next, N,N-dimethylbenzyl amine and a monofunctional alcohol such as n-propanol, ethanol or octadecanol are then added to form a polymeric mixture having an acid number between 200 to 210. The nitrogen blanket is then removed and 4-methoxyphenol and N,N-dimethylbenzylamine is added. Over a period of time, for example 60 to 90 minutes, a hydroxy-functional acrylate such as 4-hydroxybutyl acrylate or 2-hydroxy-ethyl acrylate is added until the acid number of the polymeric mixture is between 130 to 140. The polymeric mixture is then distilled and 4-methoxyphenol is added along with ammonium hydroxide and deionized water. The mixture is then heated, for example to 99 degrees C. The MIBK and water are then removed by distillation. When all of the MIBK has been removed, the water is returned to the mixture as a water/ammonia distillate.

The photoinitiators employed in the present invention, are selected from commercially available acid and base generating photoinitiators. While not wishing to be bound by theory, it is believed that the acidic or basic dispersion, which is photogenerated in the aqueous medium by the action of the radiation and photoinitiator, serves to instantly shift the equilibrium of the polymeric dispersion in the medium and cause the polymer to precipitate out of solution forming a film. Thus, where base generating photoinitiators are employed, acidic polymeric dispersions are preferred. Likewise, where acid generating photoinitiators are employed, basic polymeric dispersions are preferred.

Base generating photoinitiators suitable for use in the present invention include carbamates such as 3',5'-dimethoxybenzoin carbamate, orthonitrobenzyl carbamate; oximes such as orthophenylacetyl acetophenone oxime and 0,0'-succinyl diacetophenone oxime; and inorganic amines such as bromo (pentamine)cobalt(II) chloride, alkylamine cobalt; and complexes of the general structure $Co(NH_2Z_5)(K)_n$ where Z is a methyl or n-propyl group, K is chloride, bromide or perchlorate ion and n is an integer from 1 to 2.

Acid generating photoinitiators suitable for use in the present invention include diazonium salts; sulfonium salts; iodomium salts; ferocinium salts; tetraphenyl-phosphonium tetrafluoro phosphate; phenanthrolium bis-hexafluorophosphate; diphenylsulfoxonium hexafluorophosphate; triphenylselenonium salts; triphenyltelluronium salts; 2,6-diphenyl-4-p-chloro phenylthiopyryliumtetrafluoroborate; and cyclopentadienyl isopropylbenzene Iron (II).

The preferred diazonium salts are selected from 2,5-diethoxy-4-(p-tolylmercapto)benzene diazonium hexafluorophosphate, 2,4,6-trichlorobenzene diazonium hexafluorophosphate, 2,4,6-tribromobenzene diazonium hexafluorophosphate, p-chloro benzene diazonium hexafluorophosphate.

The preferred sulfonium salts are selected from triarylsulfoniumhexafluorophosphate and triarylsulfonum hexafluoroantimonate.

The preferred iodonium salts are selected from diphenyliodoniumhexafluorophosphate, diphenyliodonium hexafluoroarsenate, diphenyliodoniumtrifluoromethane sulfonate, diaryliodoniumtrifluoromethane sulfonate and UV 9310-C (available from GE Silicones, Waterford, N.Y.).

In addition to the optionally radiation curable, photoneutralizable polymer and photoinitiator, small amounts of free radical photoinitiator and water soluble or dispersible diluents may be added to the aqueous dispersions of the invention for improved film performance properties. These water soluble or dispersible diluents include, but are not limited to, vinyl monomers such as lower alkyl esters of acrylic or methacrylic acid including methyl methacrylate, ethyl acrylate, 2-ethylhexyl acrylate, butyl acrylate and isobutyl methacrylate; vinyl esters such as vinyl acetate and vinyl propionate; vinyl halides; and high solvency monomers such as 2,2-ethoxyethoxyethyl acrylate, tetrahydrofurfuryl acrylate, n-laurylacrylate, 2-phenoxy ethyl acrylate, glycidyl acrylate, glycidylmethacrylate, isodecylacrylate, isoctyl acrylate. Other diluents include vinyl aromatics such as styrene, alphamethyl styrene, vinyl toluene, indene and p-tert butyl styrene, fumaric acid, maleic anhydride and nitrogen containing monomers such as acrylonitrile, acrylamide, methacrylamide, N,N-dimethylacrylamide, N-vinylpyrrolidine and N-vinyl caprolactam. These and other suitable diluents are widely known and some are described in U.S. Pat. No. 4,745,138 which is incorporated herein by reference. Generally the diluents and other additives must not be reactive with the photoneutralization of the polymer dispersion, i.e. will not copolymerize therewith, and shall be water soluble or dispersible. It is important that the additives and diluents do not interfere with the polymerization, photoneutralization or precipitation of the polymeric dispersion.

The amount of polymer having substantially free of cationic polymerizable functionalities employed in the energy curable compositions herein ranges from about 5 wt. % to about 25 wt. %; the amount of polymer having free radical polymerizable functionalities used ranges from about 5 wt. % to about 50 wt. %; the amount of cationic photoinitiator used will typically range from about 0.01 wt. % to about 5 wt. %; and the amount of free radical photoinitiator used will typically range from about 2 wt. % to about 10 wt. %.

The curable compositions of the present invention are cured by means of radiation. As used herein, the term "radiation" shall mean electron beam, ultra-violet light, gamma rays, etc., but preferably the term means ultra-violet light or electron beam.

The aqueous polymeric dispersions of the present invention dry instantly. Thus, there is no need for water removal at or during curing. When used as a coating or printing ink, they may be applied by any suitable means, such as by spraying, dipping, flow coating, brushing and the like, followed by or simultaneously with irradiation. Since the energy curable compositions of the invention are aqueous based no volatile organic compounds (VOCs) are present which renders the compositions water washable. Also, the problem of transdermal migration of acrylates, common in many solvent based energy curable cross-linked systems, is also eliminated in these aqueous based dispersions.

The following examples will serve to illustrate the specific aspects of the present invention. The examples as well as other embodiments set forth in the specification are intended to be illustrative of the invention and shall not necessarily limit the scope thereof in any respect or be construed as such. In the examples and throughout the specification and claims, all parts and percentages are by weight unless otherwise expressly stated.

EXAMPLE 1 (COMPARATIVE)

A water based blue printing ink was prepared by combining Sunsperse BHD-6000 aqueous dispersion (40 wt. %, pH 8, a Sunsperse is trademark of the Sun Chemical Corporation, Fort Lee, N.J.) and an acrylic aqueous dispersion (60 wt. %, E-1691 having a pH 5.7, available from Rohm and Hass Corporation, Philadelphia, Pa.). The resulting printing ink had a pH of 7.6.

EXAMPLE 2

To the printing ink prepared in Example 1 was added Cyracure 6990 (5 parts, 50 vol % triarylsulfonium hexafluoro phosphate salt in propylene carbonate, Cyracure is a trademark of the Union Carbide Corporation, Danbury, Conn.).

EXAMPLE 3

The printing inks of Examples 1 and 2 were each printed onto a polyester substrate with a flexographic printer and exposed to ultra-violet light (400 watt/inch @400 feet per minute). The printing ink of Example 1 was very soft, easily smeared surface and took at least 24 hours to dry. However, the printing ink of Example 2 dried immediately and had a non-smear surface, an indication of an ink having excellent substrate adhesion.

EXAMPLE 4

A coating was prepared by removing the pigment from the formulation described in Example 2.

EXAMPLE 5

The pH of the printing ink prepared in Example 2 was adjusted to a pH of 10 by adding ammonia. The printing ink was then printed onto a polyester substrate and exposed to ultraviolet light (400 watt/inch @400 feet per minute). The printing ink dried immediately and had a non-smear surface.

EXAMPLE 6 (COMPARATIVE)

A standard water based black printing ink was prepared with an epoxy ester based aqueous ink. The pH of the resulting ink was 8.5.

EXAMPLE 7

To the ink prepared in Example 6 was added Cyracure 6990 photoinitiator (5 parts, 50 vol % triarylsulfoniumhexafluorophosphate salt in propylene carbonate). The pH of the resulting ink was 8.4.

EXAMPLE 8

The printing inks of Examples 6 and 7 were each printed onto a polyester substrate with a flexographic printer and exposed to ultra-violet light (400 watt/inch @400 feet per minute). The printing ink of Example 6 was very soft surface and was easily smeared. However, the printing ink of Example 7 had a much harder, non-smear, surface.

EXAMPLE 9

A black printing ink was prepared by adding a black pigment (15 wt. %), a water soluble epoxy polyacrylate (15 wt. %) (BASF Laromer 8765, available from BASF Corp., Mt. Olive, N.J.), a reactive styrene maleic acrylated resin modified with hydroxyethyl acrylate (20 wt. %), water (46 wt. %), a free radical photoinitiator (2 wt. %, Irgacure 2959, Irgacure is a trademark of Ciba Specialties, Corp., Tarrytown, N.Y.), a cationic photo initiator (1 wt. %, 50 vol % triarylsulfoniumhexafluorophosphate salt in propylene carbonate, Cyracure 6990), a wetting additive Tego Glide 435 (0.5 wt. %, Tego Glide is a trademark of Tego Chemie Service GmbH, Essen, Germany) and ammonia (0.5 wt. %). The resulting printing ink had a pH between 7 and 8.

The printing ink was applied to a metallized paper substrate with a flexographic printing device and exposed to ultraviolet light (240 mJ/cm$^2$ @200 feet per minute). The printing ink was resistant to 30 alcohol (e.g. methylethylketone) rubs and had a color density of 1.9.

EXAMPLE 10

A red printing ink was prepared by adding Sunsperse pigment dispersion (35 wt. %, of which 30 wt. % is pigment), Laromer 8765 (17 wt. %), reactive styrene maleic acrylated resin modified with hydroxyethyl acrylate (17 wt. %), water (27 wt. %), Irgacure 2959(2 wt. %) and Cyracure 6990 (1 wt. %), Tego Glide 435 (0.5 wt. %) and ammonia (0.5 wt. %). The resulting printing ink had a pH between 7 and 8.

The printing ink was applied to a metallized paper substrate with a 450 line flexoanilox device and exposed to ultra-violet light (250 mJ/cm$^2$ @120 feet per minute). The printing ink was resistant to 50 alcohol rubs and had a color density of 2.0.

EXAMPLE 11

A coating was prepared by adding an styrene maleic anhydride acrylate (20 wt. %), epoxy acrylate (30 wt. %, Laromer 8765) water (47 wt. %), and a iodonium hexafluoroanimonate photoinitiator (0.5 wt. %, UV9365C-D1, available from GE Silicones, Waterford, N.Y.)

EXAMPLE 12

An ink was prepared by adding a carbon black pigment to the procedure described in Example 11.

EXAMPLE 13 (COMPARATIVE)

A coating was prepared by the procedure described in Example 11, except the iodonium hexafluoroanimonate photoinitiator was omitted.

EXAMPLE 14

The coatings of Examples 11 and 13 were applied to with a #2 rod and exposed to an electron beam (165kV, 2.6 Mrad, oxygen content less than 200 ppm, @50 feet per minute). The coating of Example 11 was resistant to between 70–90 alcohol rubs, whereas the coating of Example 13 was resistant to between 40–50 alcohol rubs.

EXAMPLE 15

A coating was prepared by adding an styrene maleic anhydride acrylate modified with hydroxy ethyl acrylate (36 wt. %), an epoxy acrylate (10 wt. %, Laromer 8765, water (48 wt. %), Igracure 2959 (1 wt. %) and a cationic photoinitiator (1.0 wt. % Cyracure 6990).

The coating was odorless when applied with a #3 Mayer bar onto a leneta substrate. The coating was then exposed to ultra-violet light (400 watt/in @200 feet per minute). The rub resistance of the coating to alcohol (e.g. methyl ethyl ketone) was greater than 100 and the gloss was between 87 and 94. The scratch resistance was also excellent.

The present invention has been described in detail, including the preferred embodiments thereof. However, it will be apparent to those of skill in the art, upon consideration of the present disclosure, that the invention is capable of numerous modifications, substitutions, rearrangements of parts and/or improvements without departing from the spirit and scope of the invention as set forth in the following claims.

What is claimed is:

1. An aqueous polymer dispersion comprising a polymer substantially free of cationic polymerizable groups and a cationic photoinitiator, wherein the polymer is capable of being precipitated by an acid generating photoinitiator upon exposure to radiation.

2. The aqueous polymer dispersion of claim 1 wherein the polymer is selected from polyamide resins, acrylic resins, acrylated acrylic resins, amino resins, polyester resins, urethane resins, starch, polysulfonate resins, phenolic resins and melamine resins.

3. The aqueous polymer dispersion of claim 1 wherein the polymer is an energy curable polymer having the general structure:

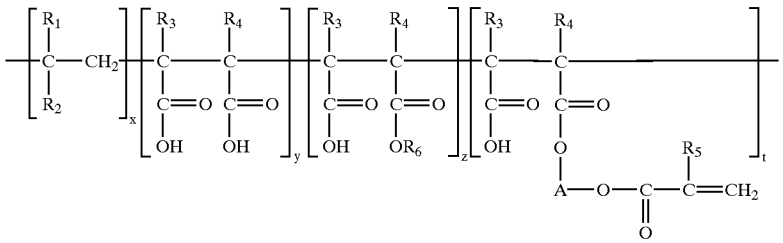

wherein: $R_1$ and $R_2$ are independently selected from the group consisting of hydrogen, $C_1$–$C_{20}$ alkyl, $C_6$–C10 aryl, $C_7$–$C_{14}$ alkaryl, $C_4$–$C_{12}$ cycloalkyl and halogen such as chlorine, fluorine and bromine; $R_3$, $R_4$ and $R_5$ are independently selected from the group consisting of hydrogen and $C_1$–$C_5$ alkyl; $R_6$ is selected from the group consisting of alkyl, aralkyl, alkyl substituted aralkyl and oxyalkylated derivatives of same containing 2 to 4 carbon atoms in each oxyalkylene group, which group may be 1 to 20 and preferably 1 to 6 repeating units; A is a linear or branched divalent $C_1$–$C_{20}$ alkylene or oxyalkylated derivative thereof as described in connection with $R_6$; and subscripts x, y, z and t are whole numbers such that the sum of x, y, z and t ranges from 3 to 20, with each being equal to or greater than 1.

4. The aqueous polymer dispersion of claim 1 wherein the acid generating photoinitiator is selected from diazonium salts; sulfonium salts; iodomium salts; ferocinium salts; tetraphenylphosphonium tetrafluorophosphate; phenanthrolium bis-hexafluorophosphate; diphenylsulfoxonium hexafluorophosphate; triphenylselenonium salts; triphenyltelluronium salts; 2,6-diphenyl-4-p-chloro phenylthiopyryliumtetrafluoroborate; and cyclopentadienyl isopropylbenzene Iron (II).

5. The diazonium salts in claim 4 selected from 2,5-diethoxy-4-(p-tolylmercapto)benzene diazonium hexafluorophosphate, 2,4,6-trichlorobenzene diazonium hexafluorophosphate, 2,4,6-tribromobenzene diazonium hexafluorophosphate, p-chloro benzenediazonium and hexafluorophosphate.

6. The sulfonium salts in claim 4 selected from triarylsulfoniumhexafluorophosphate and triarylsulfonum hexafluoroantimonate.

7. The iodonium salts in claim 4 selected from diphenyliodoniumhexafluorophosphate, diphenyliodonium hexafluoroarsenate, diphenyliodoniumtrifluoromethane sulfonate, diaryliodoniumtrifluoromethane sulfonate and UV 9310-C (available from GE Silicones, Waterford, N.Y.).

8. The aqueous polymer dispersion of claim 3 wherein $R_1$ and $R_2$ are independently selected from hydrogen, methyl, phenyl, benzyl, and $C_4$–C6 cycloalkyl.

9. The polymer dispersion of claim 3 wherein $R_3$, $R_4$ and $R_5$ are independently selected from hydrogen and methyl.

10. A water based coating composition comprising: (i) the aqueous polymer dispersion of claim 1; (ii) an acid generating photoinitiator; and (iii) a free radical photoinitiator.

11. The coating of claim 10 wherein the polymer is selected from polyamide resins, acrylic resins, acrylated acrylic resins, amino resins, polyester resins, urethane resins, starch, polysulfonate resins, phenolic resins and melamine resins.

12. The coating of claim 10 wherein the polymer is an energy curable polymer having the general structure:

wherein: $R_1$ and $R_2$ are independently selected from the group consisting of hydrogen, $C_1$–$C_{20}$ alkyl, $C_6$–$C_{10}$ aryl, $C_7$–$C_{14}$ alkaryl, $C_4$–$C_{12}$ cycloalkyl and halogen such as chlorine, fluorine and bromine; $R_3$, $R_4$ and $R_5$ are independently selected from the group consisting of hydrogen and $C_1$–$C_5$ alkyl; $R_6$ is selected from the group consisting of alkyl, aralkyl, alkyl substituted aralkyl and oxyalkylated derivatives of same containing 2 to 4 carbon atoms in each oxyalkylene group, which group may be 1 to 20 and preferably 1 to 6 repeating units; A is a linear or branched divalent $C_1$–$C_{20}$ alkylene or oxyalkylated derivative thereof as described in connection with $R_6$; and subscripts x, y, z and t are whole numbers such that the sum of x, y, z and t ranges from 3 to 20, with each being equal to or greater than 1.

13. The coating composition of claim 10 wherein the acid generating photoinitiator is selected from diazonium salts; sulfonium salts; iodomium salts; ferocinium salts; tetraphenylphosphonium tetrafluorophosphate; phenanthrolium bis-hexafluorophosphate; diphenylsulfoxonium hexafluorophosphate; triphenylselenonium salts; triphenyltelluronium salts; 2,6-diphenyl-4-p-chloro phenylthiopyryliumtetrafluoroborate; and cyclopentadienyl isopropylbenzene Iron (II).

14. The coating composition of claim 13 wherein the diazonium salts are selected from 2,5-diethoxy-4-(p-tolylmercapto)benzene diazonium hexafluorophosphate, 2,4,6-trichlorobenzene diazonium hexafluorophosphate, 2,4,6-tribromobenzene diazonium hexafluorophosphate, p-chloro benzenediazonium and hexafluorophosphate.

15. The coating composition of claim 13 wherein the sulfonium salts are selected from triarylsulfoniumhexafluorophosphate and triarylsulfonum hexafluoroantimonate.

16. The coating composition of claim 13 wherein the iodonium salts are selected from diphenyliodonium hexafluorophosphate, diphenyliodonium hexafluoroarsenate, diphenyliodoniumtrifluoromethane sulfonate, diaryliodoniumtrifluoromethane sulfonate and UV 9310-C (available from GE Silicones, Waterford, N.Y.).

17. A water based printing ink composition comprising:(i) the aqueous polymer dispersion of claim 1; (ii) an acid generating photoinitiator; (iii) a free radical photoinitiator; and (iv) a pigment.

18. The printing ink of claim 17 wherein the polymer is selected from polyamide resins, acrylic resins, acrylated acrylic resins, amino resins, polyester resins, urethane resins, starch, polysulfonate resins, phenolic resins and melamine resins.

19. The printing ink of claim 17 wherein the polymer is an energy curable polymer having the general structure:

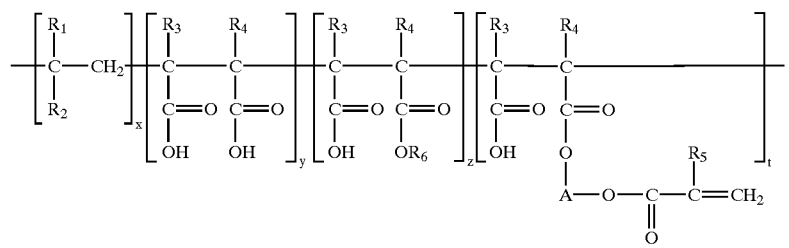

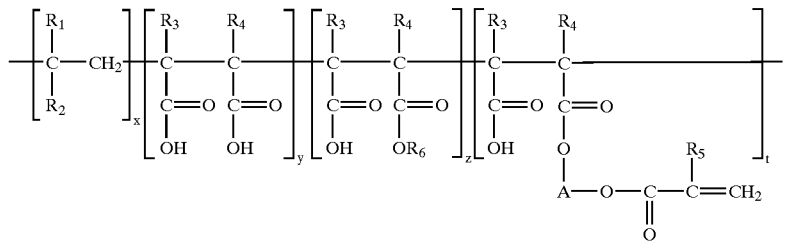

wherein: $R_1$ and $R_2$ are independently selected from the group consisting of hydrogen, $C_1$–$C_{20}$ alkyl, $C_6$–$C_{10}$ aryl, $C_7$–$C_{14}$ alkaryl, $C_4$–$C_{12}$ cycloalkyl and halogen such as chlorine, fluorine and bromine; $R_3$, $R_4$ and $R_5$ are independently selected from the group consisting of hydrogen and $C_1$–$C_5$ alkyl; $R_6$ is selected from the group consisting of alkyl, aralkyl, alkyl substituted aralkyl and oxyalkylated derivatives of same containing 2 to 4 carbon atoms in each oxyalkylene group, which group may be 1 to 20 and preferably 1 to 6 repeating units; A is a linear or branched divalent $C_1$–$C_{20}$ alkylene or oxyalkylated derivative thereof as described in connection with $R_6$; and subscripts x, y, z and t are whole numbers such that the sum of x, y, z and t ranges from 3 to 20, with each being equal to or greater than 1.

20. The printing ink of claim 17 wherein the acid generating photoinitiator is selected from diazonium salts; sulfonium salts; iodomium salts; ferocinium salts; tetraphenylphosphonium tetrafluorophosphate; phenanthrolium bis-hexafluorophosphate; diphenylsulfoxonium hexafluorophosphate; triphenylselenonium salts; triphenyl-telluronium salts; 2,6-diphenyl-4-p-chloro phenylthiopyryliumtetrafluoroborate; and cyclopentadienyl isopropylbenzene Iron (II).

21. The printing ink of claim 20 wherein the diazonium salts are selected from 2,5-diethoxy-4-(p-tolylmercapto) benzene diazonium hexafluorophosphate, 2,4,6-trichlorobenzene diazonium hexafluorophosphate, 2,4,6-tribromobenzene diazonium hexafluorophosphate, p-chloro benzenediazonium and hexafluorophosphate.

22. The coating composition of claim 20 wherein the sulfonium salts are selected from triarylsulfoniumhexafluorophosphate and triarylsulfonum hexafluoroantimonate.

23. The coating composition of claim 20 wherein the iodonium salts are selected from diphenyliodoniumhexafluorophosphate, diphenyliodonium hexafluoroarsenate, diphenyliodoniumtrifluoromethane sulfonate, diaryliodoniumtrifluoromethane sulfonate and UV 9310-C (available from GE Silicones, Waterford, N.Y.).

24. An aqueous polymer dispersion comprising a polymer substantially free of cationic polymerizable groups and a cationic photoinitiator, wherein the polymer is capable of being precipitated by a base generating photoinitiator upon exposure to radiation.

25. The aqueous polymer dispersion of claim 24, wherein the base generating photoinitiator is selected from carbamates, oximes, inorganic amines, and complexes of the general structure $Co(NH_2Z_5)(K)_n$ where Z is a methyl or n-propyl group, K is chloride, bromide or perchlorate ion and n is an integer from 1 to 2.

26. The aqueous polymer dispersion of claim 24 wherein the polymer is selected from polyamide resins, acrylic resins, acrylated acrylic resins, amino resins, polyester resins, urethane resins, starch, polysulfonate resins, phenolic resins and melamine resins.

27. The aqueous polymer dispersion of claim 24 wherein the polymer is an energy curable polymer having the general structure:

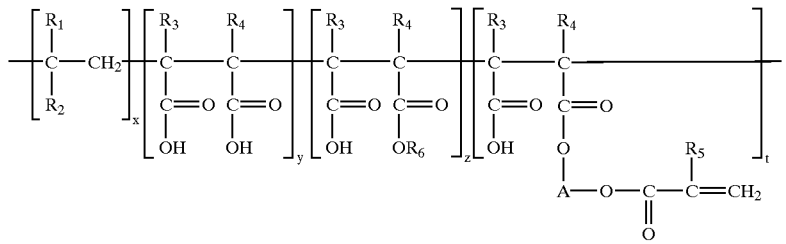

wherein: $R_1$ and $R_2$ are independently selected from the group consisting of hydrogen, $C_1$–$C_{20}$ alkyl, $C_6$–$C_{10}$ aryl, $C_7$–$C_{14}$ alkaryl, $C_4$–$C_{12}$ cycloalkyl and halogen such as chlorine, fluorine and bromine; $R_3$, $R_4$ and $R_5$ are independently selected from the group consisting of hydrogen and $C_1$–$C_5$ alkyl; $R_6$ is selected from the group consisting of alkyl, aralkyl, alkyl substituted aralkyl and oxyalkylated derivatives of same containing 2 to 4 carbon atoms in each oxyalkylene group, which group may be 1 to 20 and preferably 1 to 6 repeating units; A is a linear or branched divalent $C_1$–$C_{20}$ alkylene or oxyalkylated derivative thereof as described in connection with $R_6$; and subscripts x, y, z and t are whole numbers such that the sum of x, y, z and t ranges from 3 to 20, with each being equal to or greater than 1.

* * * * *